Jan. 12, 1932.      E. M. RAYBURN ET AL      1,840,864
POWER TRANSMISSION APPARATUS
Original Filed Nov. 24, 1920      5 Sheets-Sheet 3
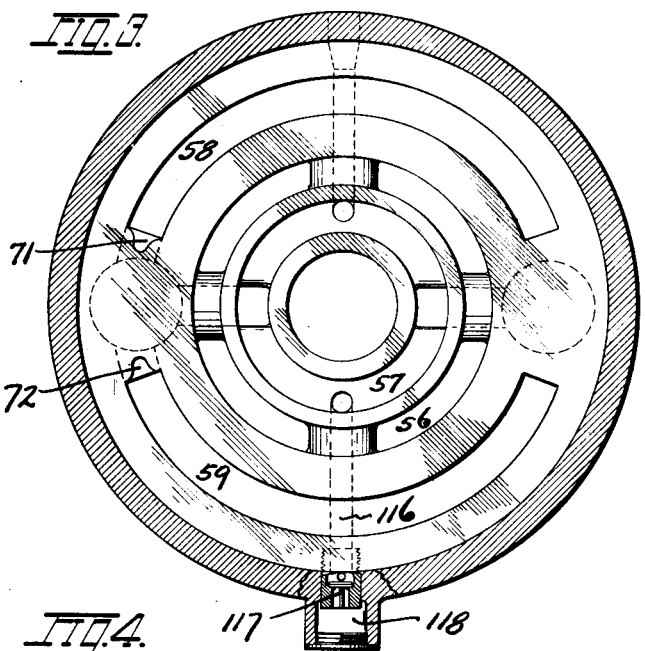
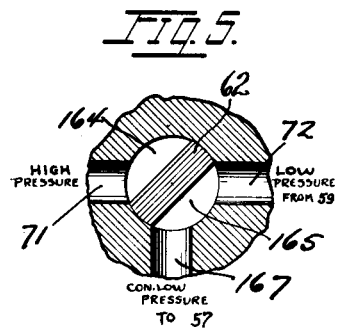
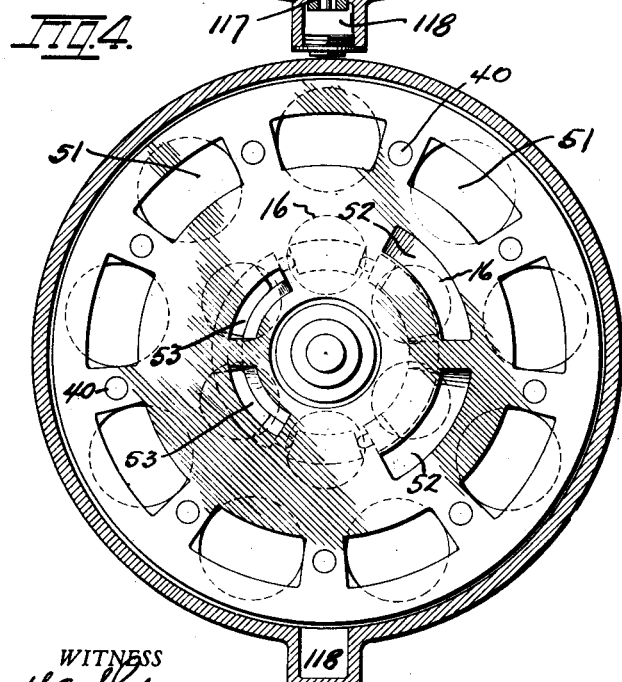
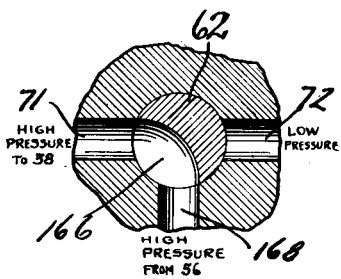
INVENTORS
Elwyn M. Rayburn
and Alden G. Rayburn
BY
White Prost Evans
their ATTORNEYS Jan. 12, 1932.  E. M. RAYBURN ET AL  1,840,864
POWER TRANSMISSION APPARATUS
Original Filed Nov. 24, 1920  5 Sheets-Sheet 4
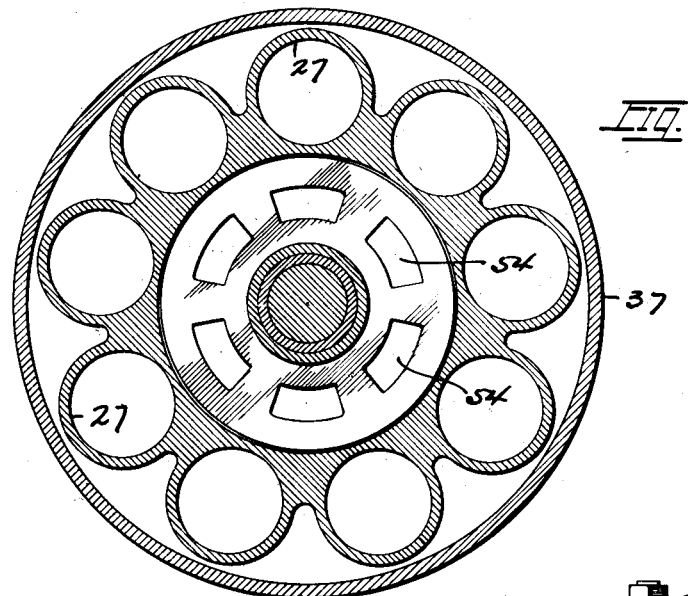
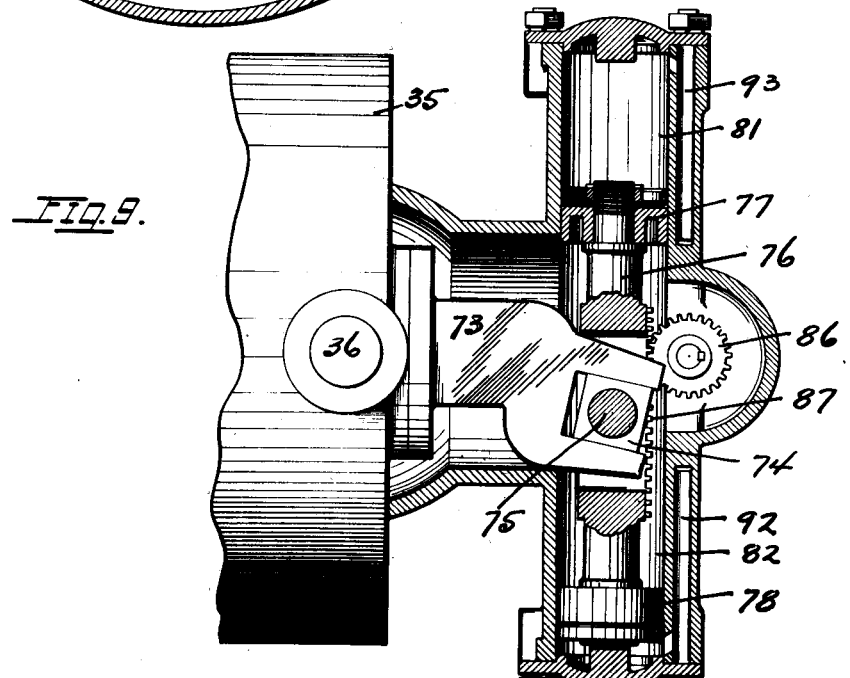
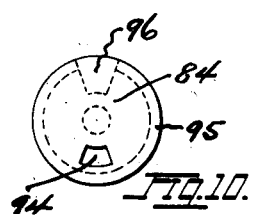
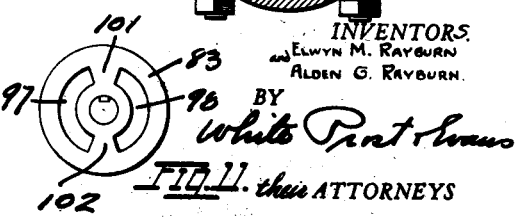
INVENTORS.
Elwyn M. Rayburn
Alden G. Rayburn.
BY
their ATTORNEYS

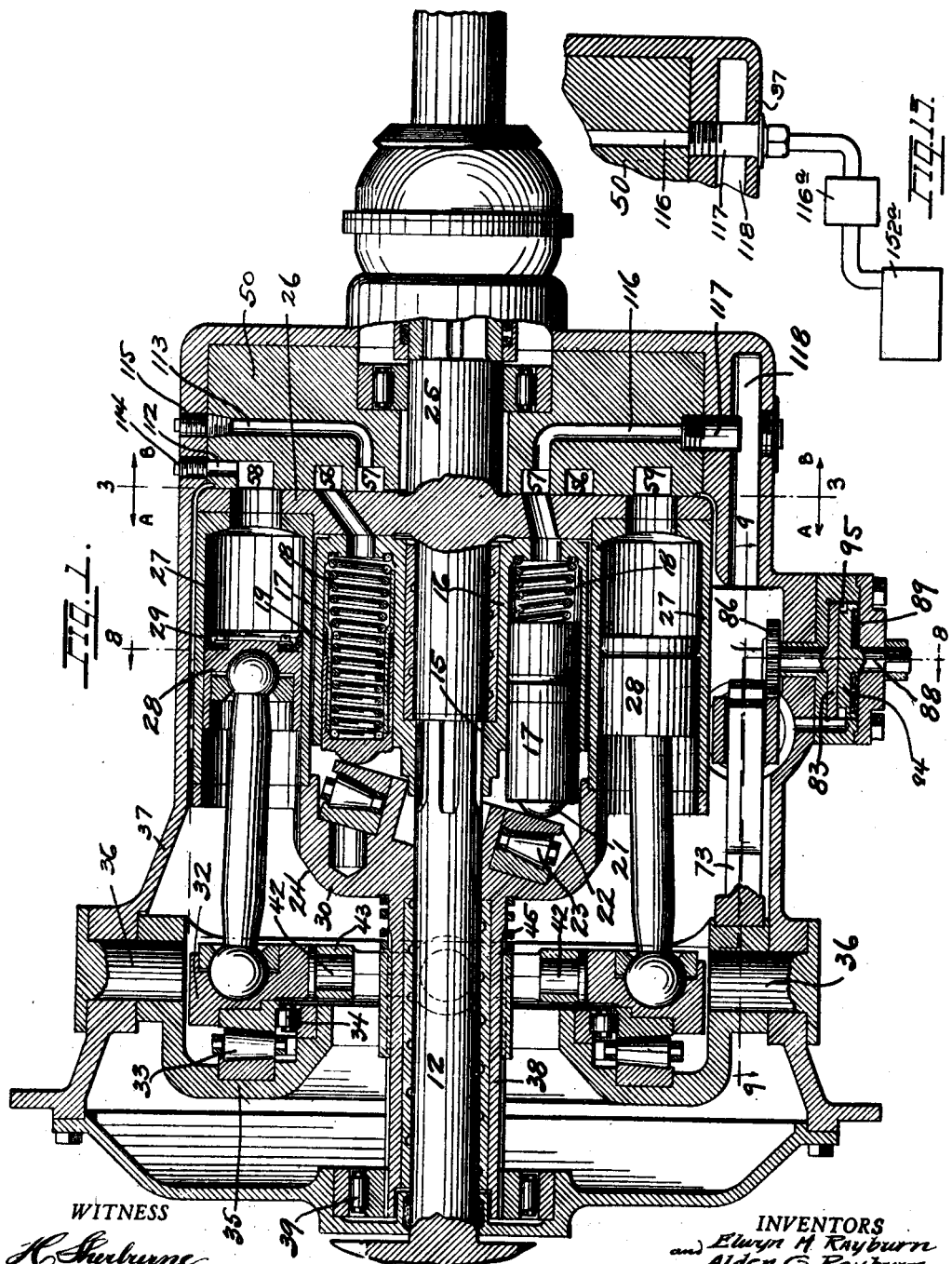

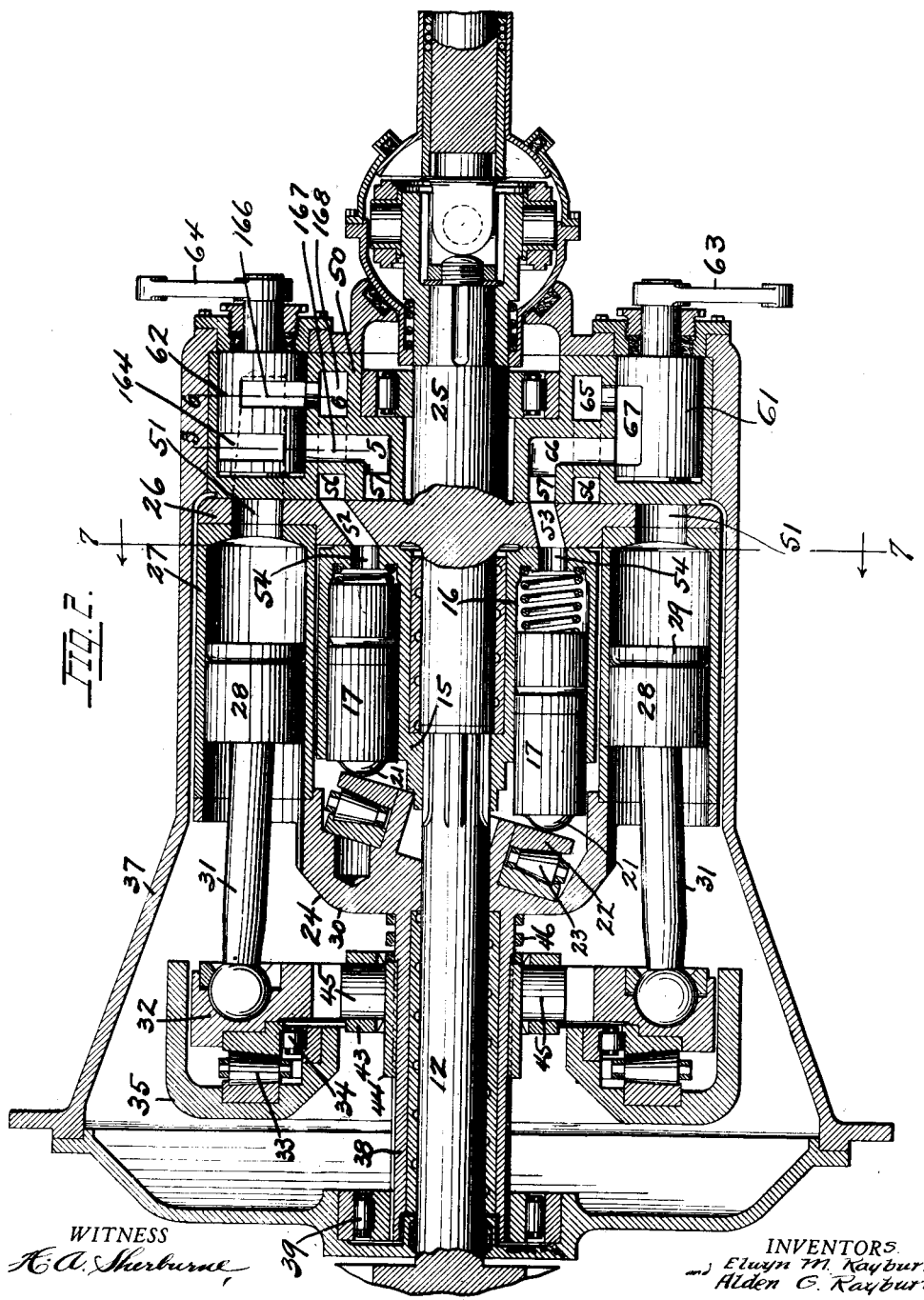

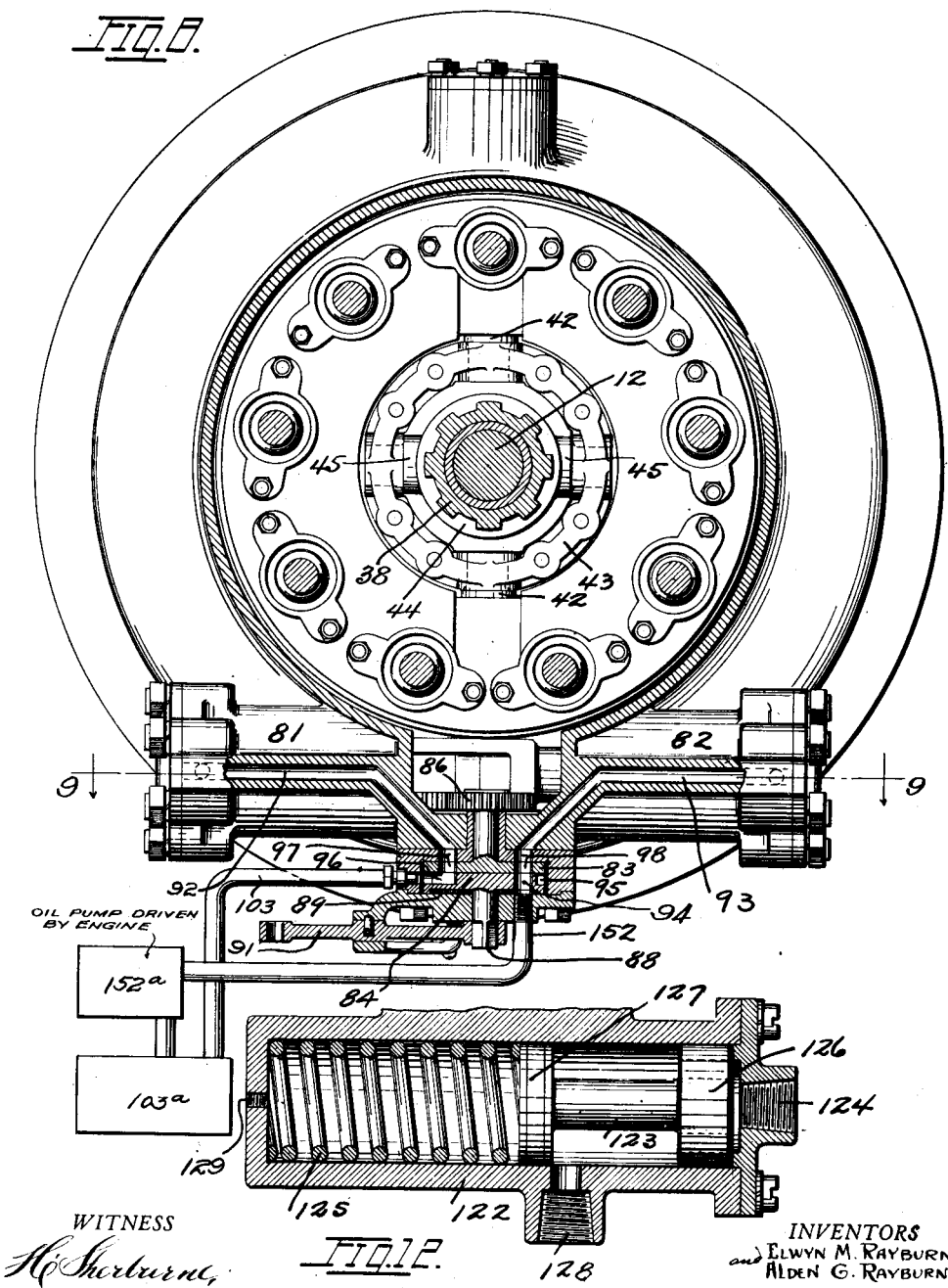

Patented Jan. 12, 1932

1,840,864

UNITED STATES PATENT OFFICE

ELWYN M. RAYBURN AND ALDEN G. RAYBURN, OF SAUSALITO, CALIFORNIA, ASSIGNORS, BY DIRECT AND MESNE ASSIGNMENTS, OF ELEVEN AND ONE-HALF PER CENT TO SAID ELWYN M. RAYBURN, ELEVEN AND ONE-HALF PER CENT TO SAID ALDEN G. RAYBURN, ELEVEN AND ONE-HALF PER CENT TO EDDY S. RAYBURN, OF SAUSALITO, CALIFORNIA, FOURTEEN AND ONE-HALF PER CENT TO JAMES WAYNE SUMNER, OF SAN FRANCISCO, CALIFORNIA, AND FIFTY-ONE PER CENT TO AUTOMOTIVE ENGINEERING CORPORATION, A CORPORATION OF DELAWARE

POWER TRANSMISSION APPARATUS

Application filed November 24, 1920, Serial No. 426,204. Renewed March 11, 1929.

The invention relates to variable speed variable torque power transmission apparatus for transmitting power from a driving element to a driven element and particularly to an apparatus employing a fluid as the power transmitting medium.

An object of the invention is to provide a variable speed variable torque power transmission apparatus of the fluid or hydraulic type in which pressures are balanced to reduce friction to a minimum.

Another object of the invention is to provide an improved means for varying the speed ratio of the apparatus.

A further object of the invention is to provide an improved and simplified form of construction of apparatus and particularly of the valve which controls the distribution of the fluid.

The invention possesses other advantageous features, some of which, with the foregoing, will be set forth at length in the following description, where we shall outline in full that form of the invention which we have selected for illustration in the drawings accompanying and forming part of the present specification. In said drawings, we have shown one specific form of the apparatus of our invention, but it is to be understood that we do not limit ourselves to such form, since the invention, as set forth in the claims, may be embodied in a plurality of forms. In said drawings, we have shown the transmission embodied in a form which is particularly adapted for use in automobiles and other power propelled vehicles and while such use is large, the transmission is clearly adaptable for use in other environment.

Referring to said drawings:

Figure 1 is a vertical, longitudinal section through the apparatus of our invention arranged for installation in an automobile.

Fig. 2 is a horizontal, longitudinal section through the apparatus.

Fig. 3 is a cross section taken on the line 3—3, Fig. 1, looking in the direction of the arrows B—B.

Fig. 4 is a cross section taken on the line 3—3, Fig. 1, looking in the direction of the arrows A—A.

Fig. 5 is a cross section taken on the line 5—5, Fig. 2.

Fig. 6 is a cross section taken on the line 6—6, Fig. 2.

Fig. 7 is a cross section taken on the line 7—7, Fig. 2.

Fig. 8 is a cross section taken on the line 8—8, Fig. 1.

Fig. 9 is a section taken on the line 9—9, Fig. 8.

Fig. 10 is a plan view of one control valve.

Fig. 11 is a plan view of the other control valve.

Fig. 12 is a section of a control valve for maintaining an oil pressure in the casing.

Fig. 13 is a detail showing means for introducing liquid under pressure into the low pressure side of the apparatus.

The apparatus comprises a driving element adapted to be connected to the crank shaft of the engine and a driven element, flexibly connected thereto by a fluid medium, which is adapted to be secured to the propeller shaft of the vehicle. The flexibility of the connection between the driving and driven elements may be varied at will, to vary the ratio of the speeds of the two elements, and power operated means are provided for actuating the parts to produce the speed ratio variation. The fluid displaced by the relative rotation of the driving element with respect to the driven element is employed to do useful work in rotating the driven element so that the torque of the driven element is varied with the speed ratio.

The driving element comprises a shaft 12 having a flange on its forward end which is bolted to the flange on the rear end of the crank shaft. The rear end of the shaft 12 is splined and secured thereto and rotatable therewith is a pump cylinder block 15 containing a plurality of pump cylinders, 16, in the present instance there being six pump cylinders. In each cylinder 16 there is disposed a hollow piston 17, which is pressed forward by a coiled spring 18 which is formed conical at that part which is not in contact with the side walls of the hollow piston, to prevent lateral bending of the spring under compression. These springs serve to move the pistons forward when the apparatus is being initially filled with fluid and serve to maintain the oil conduits full under operating conditions, when there is a leakage of oil from the conduits or cylinders. The piston is preferably formed of two parts screwed together, to form an exterior circumferential groove in which is disposed a circular packing, preferably in the form of a U-leather ring 19, whereby leakage between the cylinder and piston is effectively prevented. The pistons are provided with rounded heads 21 which bear against the angularly disposed, freely rotatable ring 22, supported on the roller bearings 23, which are in turn mounted on an extension of the motor cylinder block 24.

The motor cylinder block 24, to which the driven shaft 25 is secured, comprises a circular plate 26 integral with the driven shaft and carrying a plurality of motor cylinders 27, in the present construction there being nine motor cylinders. The cylinder block 24 comprises, among other elements, the circular plate 26, the end block 30 and the intermediate cylinders 27. The cylinders are formed separately and engage in seats in the plate 26 and the end block 30 and the elements are secured together to form a rigid cylinder block, by bolts 40 connecting the end block and plate and disposed between the cylinders. Each motor cylinder 27 is provided with a piston 28 having a suitable cup leather packing 29. The pistons are connected by piston rods 31 with the angularly adjustable motor drive plate 32. The drive plate 32 is mounted on roller bearings 33—34, and is free to rotate in the angularly adjustable housing 35. The housing is journaled on the diametrically opposed studs 36, secured to the stationary casing 37.

The end block 30 is provided with a sleeve 38 in which the driving shaft 12 is journaled and the sleeve is journaled at its forward end in the roller bearing 39 mounted in the casing 37. The circular motor drive plate 32 is connected to the sleeve 38, so that the power developed by the motor pistons and transmitted to the drive plate is transmitted to the sleeve and consequently to the circular plate 26 which is integral with the driven shaft. Formed on the inner periphery of the drive plate are two diametrically disposed studs 42 which are journaled in the ring 43 surrounding the sleeve 38. Splined to the sleeve is a collar 44 having diametrically disposed studs 45 projecting therefrom and disposed at right angles to the studs 42, and these latter studs 45 are journaled in the ring 43. This forms a gimbal joint between the drive plate and the sleeve, transmitting power to the sleeve and permitting angular adjustment of the drive plate. Interposed between the collar 44 and the end block 30 is a coiled spring 46 which operates to press the rear face of the plate 26 against the face of the stationary valve structure 50. When the apparatus is in operation, a fluid pressure is developed therein which relieves the pressure of the plate 26 on the valve structure and forces lubricant between the two surfaces, forming a floating bearing.

The plate 26 is provided with a plurality of ports 51 opening into the respective motor cylinders, and these ports extend directly through the plate 26 and open on the rear face thereof. The motor cylinders are longitudinally disposed and are arranged in a circle surrounding the circle of the longitudinally disposed pump cylinders 16. The plate 26 is further provided with two sets of passages 52 and 53, the forward ends of which are adapted to register with ports 54 in the bases of the pump cylinders 16. The bases of the pump cylinders bear against the plate 26 and as pressure is developed in the apparatus, the pressure of the pump cylinders against the plate is lessened and the surfaces are lubricated by oil under pressure to provide a floated bearing. The forward ends of the two sets of passages 52—53 are disposed in a circle on the front face of the plate 26 but the passages are inclined at different angles through the plate, so that they open on the rear of the plate in two zones having different radial displacement. The passages 52 we have designated the high pressure passages and the passages 53 we have designated the low pressure passages, for reasons which will become apparent hereinafter. The front ends of the passages 52 and 53 uncover the ports 54 in the pump cylinders and serve as timing ports to control the timing of the flow of liquid to and from the pump cylinders.

Arranged in the casing behind the plate 26, which functions as a valve plate or timing plate, is a stationary valve structure or fluid conduit structure 50 through which the liquid flows in its passage between the pump and motor cylinders. This structure is provided with two circular concentric grooves or channels 56 and 57 spaced apart radially and registering respectively with the passages 52 and 53. The channel 56 is designated the high pressure channel and the channel 57 is designated the low pressure channel. The structure 50 is also provided on its front face with two substantially semi-circular channels 58—59 which open into registry with the ports 51.

Arranged in the structure 50, on a line at right angles to the axis of the studs 36, are two diametrically disposed rotary valves 61 and 62 arranged with their axes parallel to the axis of the driven shaft and provided with operating levers 63 and 64 disposed externally of the casing. The high pressure channel 56 communicates with the face of the valve 61 through the passage 65 and the low pressure channel 57 communicates with the face of the valve 61 through the passage 66. The valve 61 is provided with a port 67 on its face, so that the valve may be turned to provide direct communication between the high pressure and low pressure channels 56 and 57, thus causing the fluid to pass to and from the pump cylinders only. This valve 61 serves the function of a clutch to release the driven element from the driving element by short-circuiting or by-passing the working fluid. When the valve 61 is turned to interrupt direct communication between the channels 56 and 57 the apparatus will function as a power transmission apparatus.

In operation, the cylinders are filled with oil or other suitable liquid and the casing is filled or partially filled with oil. Rotation of the driving shaft relative to the driven shaft causes reciprocation of the pump pistons, which normally force the oil to and receive oil from the motor pistons, causing reciprocation of the motor pistons and consequent rotation of the driven shaft. The direction of rotation of the driven shaft with respect to the driving shaft depends upon the distribution of the oil from the pump cylinders to the motor cylinders. If the oil, for instance, is introduced into one motor cylinder and the motor drive plate is at an angle, rotation of the drive plate in one direction will be produced, but if the oil is introduced into a diametrically opposite motor cylinder, rotation of the drive plate in the opposite direction will be produced. Means are provided for controlling the flow of the oil to and from the motor cylinders, so that the direction of rotation of the driven element may be reversed. The control of the direction of rotation of the driven element is effected by the cylindrical valve 62, which is disposed between adjacent ends of the channels 58 and 59. The valve 62 is provided with two ports 164 and 165 controlling the flow of low pressure oil and the port 166 controlling the flow of high pressure oil. The low pressure channel 57 communicates with the valve chamber in the zone of the ports 164, and 165, through the passage 167 and the high pressure channel 56 communicates with the valve chamber in the zone of the high pressure port 166 through the passage 168. The channels 58 and 59 which communicate with the motor cylinders are provided with bores 71 and 72 opening into the valve chamber on opposite sides thereof and spaced 90° from the openings of the channels 167 and 168. The ports in the valve 62 are so disposed that when one of the passages 167 and 168 is in communication with the bore 71 the other is in communication with the bore 72. By moving the valve, communication may be established between the high pressure channel 56 and channel 58 and low pressure channel 57 and channel 59 or vice versa, between high pressure channel 56 and channel 59 and low pressure channel 57 and channel 58. Since channels 58 and 59 are diametrically opposed, the movement of the valve causes the oil to flow to diametrically opposed cylinders, thereby reversing the direction of rotation of the driven shaft.

In operation, rotation of the driving shaft causes oil to be pumped by the pump cylinders into the motor cylinders, wherein the oil acts as the working fluid. The amount of oil pumped per revolution of the driving shaft depends on the relative rotation or the speed ratio of the two shafts, and this is controlled by varying the stroke of the motor pistons. If the stroke of the motor pistons is long, it will require many rotations of the driving shaft to produce one revolution of the driven shaft and as the stroke of the motor pistons is decreased, a lesser number of revolutions of the driving shaft will be required to produce one revolution of the driven shaft. When the stroke of the motor pistons is reduced to zero, there is no flow of oil into the motor cylinders and consequently the pump pistons cannot reciprocate and the pump and motor cylinder blocks are locked together so that the driving and driven shafts will rotate substantially in synchronism, and would rotate in absolute synchronism if it were not for the oil leakage past the contacting surfaces. The pump pistons lock against the plate 22, causing its carrying block 30 to rotate synchronously with the cylinder block 15. The variation in the stroke of the motor pistons is produced by varying the angle of inclination of the motor drive plate. Secured to the motor drive plate housing 35 adjacent one pivot is an arm 73 having a slotted end in which is disposed a slide block 74 journaled on the stud 75 which is formed integral with the bar 76 connecting the pistons 77—78. These pistons are disposed in cylinders 81—82 secured to the casing and disposed perpendicularly to the axis of the pivots of the housing 35. By introducing fluid under pressure into one or the other of the cylinders 81—82, the bar 76 is moved longitudinally and the housing 35 turned on its axis. Means are provided for predetermining the inclination of the housing and for locking it in such predetermined position. The flow of oil under pressure into the respective cylinders 81—82 is controlled by a valve composed of two contacting valve plates 83—84 to one of which 83 the gear 86 is secured and this gear is in mesh with a rack 87 formed on the bar 76, so that the gear rotates as the bar moves. The valve plate 84 is formed integral with the stem 88 which extends from the valve casing through suitable packing rings 89, and which is provided with a control lever 91. The conduits 92 and 93 communicating with the respective cylinders 81—82 open on the face of the valve plate 83 at diametrically opposite points, and the conduit 152 conveying oil under pressure opens on the lower face of the valve plate 84. This oil under pressure is derived from an oil pump 152a connected to the engine or prime mover to which the driving shaft is connected. The valve plate 84 is provided with a port 94 extending therethrough, and with a circumferential groove 95 on its upper face opening into a port 96 opening on the upper face only and disposed diametrically opposite the port 94. The upper valve plate 83 is provided with two quadrant shaped ports 97 and 98, the bridges 101 and 102 between the ports being slightly wider than the ports 94 and 96 and normally overlying these ports, preventing the flow of oil to or from the cylinders. The conduits 92 and 93 register with the ports 97 and 98. When the valve 84 is turned, port 94 opens into either of ports 97 and 98, depending upon its direction of movement, and oil under pressure flows into one cylinder and out of the other. The discharging oil discharges through the port 96 and groove 95 and thence through a conduit 103 to a reservoir 103a from which the pump 152a draws its supply. As the pistons are moved by the oil under pressure, the valve plate 83 is rotated, until it closes the inlet and discharge ports in the valve and its angle of rotation is equal to the angle of rotation of the valve plate 84. When the ports are closed, the pistons, and consequently the drive plate housing, is locked in position. By this means the drive plate housing may be moved to and locked in any predetermined inclination.

The high pressure groove 56 and the low pressure groove 57 are respectively provided with upwardly extending conduits 112 and 113 extending through the casing and normally closed by plugs 114 and 115. These conduits are for the purpose of releasing any air which becomes entrapped in the system, since the presence of air in the oil stream interferes with the operation of the apparatus. The low pressure groove 57 is also provided with a downwardly extending conduit 116 which communicates through a check valve 117 with a passage 118 in the casing communicating with the interior of the casing. The casing is filled or partially filled with oil and any leakage of oil from the conduits or cylinders is replenished from the casing through the passage 118 and the conduit 116. A deficiency of oil in the operating part of the system causes a pressure lower than atmosphere in the low pressure conduit with the consequent induction of oil through the check valve 117.

When desired, a condition of pressure in excess of atmospheric pressure may be maintained in the low pressure side of the system at all times, thus dispensing with the coiled springs 18. This may be accomplished by introducing oil under pressure, taken from the pump 152a driven by the engine into the low pressure conduit 57 and controlling such pressure so that it remains substantially constant. The pressure oil conduit in that instance would be connected to the low pressure groove 57, such as, for instance, by connection to the conduit 116 and a pressure regulating valve 116a installed in the conduit between the pump 152a and the low pressure groove as shown in Fig. 13.

A valve suitable for this purpose is shown in Fig. 12, and comprises a casing 122 having a double headed plunger 123 therein, which is normally pressed toward the outlet port 124 by a coiled spring 125. The plunger head 126 lying adjacent the outlet port is perforated to permit the passage of oil therethrough and the head 127 is imperforate, and both heads form snug sliding fits with the casing. Oil under pressure from the pump is introduced into the casing through the port 128 disposed on the side of the casing and passes through the head 126 to the low pressure side of the apparatus. As the pressure in the casing 122 increases to the desired pressure, the plunger is moved to compress the spring bringing the head 126 over and closing the inlet port 128. A subsequent fall in pressure opens the inlet port and permits the pressure to build up the desired maximum. The casing is provided with a drain vent 129 through which oil, which leaks past the plunger, may return to the pump supply tank. By maintaining a pressure within the casing at all times, there is no possibility of air being drawn into the casing when its presence would be deleterious.

We claim:

1. A power transmission apparatus, comprising a driving shaft, a plurality of pump cylinders secured to said shaft and having their axes substantially parallel to the axis of the shaft, a driven shaft, a plate on said driven shaft against which the ends of said cylinders bear, a plurality of motor cylinders secured to said plate and having their axes substantially parallel to the axis of the driving shaft, said plate being provided with ports for directing the flow of fluid between the pump cylinders and motor cylinders.

2. A variable speed power transmission apparatus, comprising a driving shaft, a plurality of pump cylinders secured to said shaft and having their axes substantially parallel to the axis of the shaft, a driven shaft, a plate on said driven shaft against which the ends of said cylinders bear, a plurality of motor cylinders secured to said plate and having their axes substantially parallel to the axis of the driving shaft, pistons in said pump cylinders, means operative by a relative rotation of said shafts for reciprocating said pistons, pistons in the motor cylinders, means for varying the stroke of the motor pistons and delivering the power developed in the motor cylinders to the driven shaft and means including said plate for directing the flow of fluid between the pump cylinders and motor cylinders.

3. A power transmission apparatus, comprising a driving shaft, a plurality of pump cylinders secured to said shaft and having their axes substantially parallel to the axis of the shaft, a driven shaft, a plate on said driven shaft against which the ends of said cylinders bear, a plurality of motor cylinders secured to said plate and having their axes substantially parallel to the axis of the driving shaft, said pump cylinders being provided with ports opening on the face of said plate and said motor cylinders being provided with ports extending through said plate and said plate being provided with ports adapted to register with said pump cylinder ports to direct the flow of fluid between the pump cylinders and motor cylinders.

4. A torque multiplying power transmission apparatus, comprising a driving member, a fluid pump carried by the driving member, a driven member, means on the driven member for operating said pump, a fluid operated motor carried by the driven member and receiving fluid from said pump and applying power to the driven member, a plate forming part of the driven member provided with ports for directing the flow of fluid between the pump cylinders and motor cylinders and a stationary structure having fluid distributing conduits therein cooperating with said plate.

5. A power transmission apparatus, comprising a driving member, a fluid pump carried by the driving member, a driven member, means on the driven member for operating said pump, a fluid operated motor carried by the driven member and receiving fluid from said pump and applying power to the driven member, a plate forming part of the driven member provided with ports for directing the flow of fluid between the pump cylinders and motor cylinders, a stationary structure having fluid distributing conduits therein cooperating with said plate and a valve in said structure for by-passing the fluid between the pump cylinders.

6. A power transmission apparatus, comprising a driving member, a fluid pump carried by the driving member, a driven member, means on the driven member for operating said pump, a fluid operated motor carried by the driven member and receiving fluid from said pump and applying power to the driven member, a plate forming part of the driven member provided with ports for directing the flow of fluid between the pump cylinders and motor cylinders, a stationary structure having fluid distributing conduits therein communicating with the pump cylinders and motor cylinders and a by-pass valve in said structure between the said fluid distributing conduits.

7. A power transmission apparatus, comprising a driving member, a fluid pump carried by the driving member, a driven member, means on the driven member for operating said pump, a fluid operated motor carried by the driven member and receiving fluid from said pump and applying power to the driven member, a plate forming part of the driven member provided with ports for directing the flow of fluid between the pump cylinders and motor cylinders, a stationary structure having fluid distributing conduits therein adapted to establish communication between discharging pump cylinders and receiving motor cylinders and between discharging motor cylinders and receiving pump cylinders and means in said structure for establishing direct communication between discharging and receiving pump cylinders.

8. A power transmission apparatus, comprising a driving shaft, a plurality of pump cylinders secured to said shaft, a driven shaft, a plate rotatable with said driven shaft against which said cylinders bear, a plurality of motor cylinders secured to said plate, pistons in said pump cylinders, means for reciprocating said pump pistons so that some pump cylinders are discharging while others are receiving fluid, pistons in said motor cylinders adapted to be reciprocated by fluid pumped by said pump, a stationary structure cooperating with said plate to distribute the fluid from the pump cylinders to the motor cylinders so that some motor cylinders are receiving fluid while others are discharging fluid, and said stationary structure including means for directing the flow of fluid to cause the fluid pumped to be distributed to motor cylinders which were previously discharging fluid.

9. A torque multiplying power transmission apparatus, comprising a driving member, a plurality of pump cylinders secured to the driving member, a driven member comprising a plate contacting with ends of the pump cylinders, a plurality of motor cylinders connected to the driven member, said plate being provided with ports communicating with the motor cylinders and with other ports opening into the pump cylinders directing the flow of fluid between the pump cylinders and the motor cylinders.

10. A torque multiplying transmission apparatus embodying a driving member, a driven member, a fluid pump comprising an element actuated by said driving member and a complemental element operatively connected to the driven member; the first said element provided with a plurality of recesses receiving fluid in operation of the apparatus and the second said element comprising members fitting into and expelling fluid from said recesses in operation of the apparatus, a fluid motor comprising rotating cylinders and pistons driving said driven member; and fluid passages between said pump and said motor.

11. The combination set forth in claim 10 in which the pump elements are rotatable elements.

12. The combination set forth in claim 10 in which the pump elements are rotatable elements and include cylinders and pistons.

13. The combination set forth in claim 10 in which the motor is of variable volumetric capacity, and means for varying said capacity.

14. The combination set forth in claim 10 in which the pump elements are rotatable and include cylinders and pistons, and said motor is of variable volumetric capacity, and means for varying said capacity.

15. A torque multiplying transmission apparatus embodying a driving member, a driven member, a rotary fluid pump comprising complemental elements, one of said elements being actuated by said driving member and provided with a plurality of recesses receiving fluid in operation of the apparatus, another of said elements being operatively connected for actuation by said driven member and comprising members fitting into and expelling fluid from said recesses in operation of the apparatus, a fluid motor comprising rotary cylinders driving said driven member, and means for distributing the fluid between said pump and said motor.

16. The combination set forth in claim 15 in which the means includes a common valve for timing the fluid to and from the pump.

17. The combination set forth in claim 15 in which the means includes a central valve, said valve comprising a rotatable part connected with the driving member and a rotatable part connected with the driven member, said rotatable parts being formed with ports registerable with each other for controlling the fluid to and from said pump.

18. A variable speed transmission apparatus embodying a driving member, a driven member, a fluid pump comprising a member continuously rotated by said driving member and a complemental member rotatable with said driven member, a plurality of motor cylinders, pistons in said motor cylinders, stationary means for controlling the stroke of said pistons, means for controlling said stationary means to cause variations in the stroke of said pistons, a valve plate rotatable with said driven member and carrying said motor cylinders, and a stationary valve member coacting with said rotatable valve plate to distribute the fluid between said pump and said motor.

19. A transmission apparatus comprising a driving member, a driven member, a fluid motor rotatable with the driven member and including an annular series of cylinders, pistons in said cylinders, a fluid pump including an annular series of cylinders, pistons in said pump cylinders, means operative by the relative rotation of said members for reciprocating said pump pistons, valve means rotatable with said driven member against which said pump cylinders bear, stationary valve means having conduits coacting with said first named valve means to connect the motor cylinders successively with the pump cylinders in predetermined succession.

20. The combination set forth in claim 19 including a valve inter-related with said conduits for changing the order of succession of the motor cylinders receiving fluid.

21. A power transmission apparatus comprising a driving shaft, a plurality of pump cylinders secured to said shaft, pistons in said cylinders, a driven shaft, a plate on and rotatable with said driven shaft, a plurality of motor cylinders secured to said plate, pistons in said motor cylinders, means operative by the relative rotation of said shafts for reciprocating said pump pistons so that the pump cylinders discharge fluid successively into successive motor cylinders, and means for changing the order of succession of the discharge of fluid into the motor cylinders.

22. A variable speed power transmission apparatus, comprising a driving shaft, a plurality of pump cylinders carried by said shaft, a driven shaft, a plate on and rotatable with said driven shaft against which said pump cylinders bear, a plurality of motor cylinders on said plate, pistons in said motor cylinders, pistons in said pump cylinders, means operative by the relative rotation of said shafts for reciprocating said pump pistons so that the pump cylinders discharge fluid successively, a stationary structure having conduits coacting with said plate to connect the motor cylinders successively with the pump cylinders in predetermined succession, and a valve in said structure for changing the order of succession of the motor cylinders receiving fluid.

23. In the combination set forth in claim 22, a second valve in said structure for establishing inter-communication between said pump cylinders.

24. A torque multiplying variable speed transmission comprising a driven shaft, a driving shaft, a variable capacity fluid motor embodying a plurality of parallel rotary cylinders connected to said driven shaft, a fluid pump actuated during relative rotation between said shafts and delivering actuating fluid to said motor comprising a plurality of parallel cylinders driven by said driving shaft, fluid ports in one end of said motor cylinders, fluid ports in the ends of said pump cylinders adjacent the port ends of said motor cylinders, a valve mechanism disposed adjacent the port ends of said cylinders comprising stationary high and low pressure fluid passages with which said pump ports communicate through 360 degrees of revolution thereof, and means for interconnecting said high pressure and low pressure fluid passages.

25. The combination set forth in claim 24 in which means are provided for varying the volumetric capacity of said motor.

26. A transmission apparatus comprising a driving member, a driven member, a fluid pump element on the driving member, an annular fluid motor connected to the driven member, and surrounding said pump element, a complemental pump element rotatable with said motor, and fluid passages between said pump and said motor.

27. The combination set forth in claim 26 in which one pump element includes cylinders having pistons therein, the other pump element including means for causing relative reciprocation between each piston and its respective cylinder.

28. The combination set forth in claim 26 in which one pump element includes parallel cylinders having pistons therein, the other pump element including means engaging said pistons to cause reciprocation thereof in said cylinders.

29. The combination set forth in claim 26 in which one pump element includes parallel cylinders having pistons therein, the other pump element including means engaging said pistons to cause reciprocation thereof in said cylinders, said motor including cylinders having pistons reciprocable therein, and means for varying the stroke of said motor pistons.

30. A transmission apparatus embodying a driving shaft, a driven shaft, a fluid motor connected to said driven shaft and formed with a central recess, a fluid pump within said recess and comprising complemental elements coacting to generate fluid pressure, one of said elements rotating with the motor and the other being driven by the driving shaft, and means for distributing the fluid between said pump and said motor.

31. The combination set forth in claim 30 in which the means includes a pressure seated valve means.

32. The combination set forth in claim 30 in which the means includes a pressure seated valve plate which forms an end wall of the central recess.

33. The combination set forth in claim 30 in which the means includes a valve plate rotatable with the motor and a stationary valve member.

34. The combination set forth in claim 30 in which the means includes a stationary valve member and a valve plate fitting against said member, the said valve plate being rotatable with the motor and forming an end wall of the central recess.

35. The combination set forth in claim 30 in which the pump element driven by the driving shaft includes a cylinder barrel formed with a plurality of cylinders, pistons in said cylinders, the element rotating with the motor including a cam plate engaging said pistons to actuate the same.

36. A fluid transmission apparatus embodying a driving member, a plurality of parallel pump cylinders secured to said driving member, pistons reciprocable in said cylinders, a driven member comprising a plate contacting with the ends of the cylinders adjacent thereto, said ends of the cylinders having ports extending therethrough, a plurality of motor cylinders connected to the driven member, pistons reciprocable in said motor cylinders, a wobble plate carried by said motor cylinders adjacent the opposite ends of the pump cylinders and engaging said pump pistons to reciprocate the latter upon relative rotation of the driving and driven members, said first named plate being provided with ports communicating with the motor cylinders and with other ports registerable with the ports in the pump cylinders, and a stationary structure provided with conduits coacting with said plate ports to connect the motor cylinders successively with the pump cylinders in predetermined succession.

37. The combination set forth in claim 36 in which the ports in the pump cylinders are of less cross-sectional area than the pump cylinders, whereby the pressure of fluid therein tends to seat the pump cylinders, the first named plate and the stationary structure tightly against each other with resulting reduction in fluid leakage.

38. The combination set forth in claim 36 including a valve in said stationary structure inter-related with said conduits for changing the order of succession of the motor cylinders receiving fluid.

39. The combination set forth in claim 36 including a valve in said stationary structure for establishing intercommunication between said pump cylinders.

40. The combination set forth in claim 36 including two valves in said stationary structure, one of said last named valves being inter-related with said conduits for changing the order of succession of the motor cylinders receiving fluid to reverse the direction of rotation of the driven shaft, the other of said last named valves arranged to establish intercommunication between said pump cylinders.

41. A torque multiplying variable speed fluid transmission embodying a driving shaft, a plurality of parallel pump cylinders secured to said driving shaft, pistons reciprocable in said cylinders, a driven shaft, a distributor plate connected to the driven shaft, and against which plate the adjacent ends of the pump cylinders bear, said ends of the cylinders having ports extending therethrough, a plurality of parallel motor cylinders surrounding said pump cylinders and connected to the distributor plate, a wobbler plate carried by said motor cylinders adjacent the opposite ends of the pump cylinders and engaging the pump pistons to actuate the latter during relative rotation between the shafts, pistons reciprocable in said motor cylinders, a stationary swash plate against which the motor pistons react, means for adjusting the inclination of said swash plate and thereby the stroke of said motor pistons, said distributor plate being provided with ports communicating with the motor cylinders and with other ports registerable with the ports in the pump cylinders, and a stationary structure provided with conduits coacting with distributor plate ports to connect the motor cylinders successively with the pump cylinders in predetermined succession.

42. The combination set forth in claim 41 including a valve in said stationary structure inter-related with said conduits for changing the order of succession of the motor cylinders receiving fluid.

43. The combination set forth in claim 41 including a valve in said stationary structure for establishing intercommunication between said pump cylinders.

44. The combination set forth in claim 41 including two valves in said stationary structure, one of said last named valves being inter-related with said conduits for changing the order of succession of the motor cylinders receiving fluid to reverse the direction of rotation of the driven shaft, the other of said last named valves arranged to establish intercommunication between said pump cylinders.

45. A torque multiplying hydraulic transmission comprising a driving shaft, a fluid pump actuated by said driving shaft embodying a plurality of pump cylinders; fluid ports in the ends of said pump cylinders; a valve member common to and controlling said ports against which the ends of said cylinders are held seated by the fluid pressures developed in said cylinders; a driven shaft by its rotation actuating elements of said pump; a fluid motor driving said driven shaft embodying a plurality of rotatable motor cylinders; fluid ports in the ends of said motor cylinders; and a valve member common to and controlling said last mentioned ports against which the ends of said motor cylinders are held seated by the fluid pressures developed therein.

46. The combination as set forth in claim 45 in which said first mentioned valve member is rotatable with relation to said pump cylinders and said second mentioned valve member is stationary.

47. The combination as set forth in claim 45 in which said valve members comprise substantially flat surfaces against which the ends of said cylinders are seated.

48. A hydraulic torque multiplying transmission comprising driving means; driven means; a pump actuated by the relative rotation of said driving and said driven means comprising a plurality of rotatable cylinders; a motor comprising a plurality of cylinders rotatable at speeds different from the speeds of rotation of said pump cylinders and driving said driven means; and means for distributing fluid between said pump and said motor.

49. The combination as set forth in claim 48 in which said last mentioned means comprises a rotary valve member timing said pump and a stationary valve member timing said motor.

50. A torque multiplying transmission apparatus embodying a driving member; a driven member; a fluid pump comprising an element actuated by said driving member and a complemental element operatively connected to said driven member; the first of said elements being provided with a plurality of recesses receiving fluid in operation of the apparatus and the second of said elements comprises members fitting into and expelling fluid from said recesses in operation of the apparatus; a fluid motor comprising reciprocating members driving said driven member, said reciprocating members being rotatable substantially as a unit about a common axis; and fluid passages between said pump and said motor.

51. The combination as set forth in claim 50 in which said motor is of variable volumetric capacity together with means for varying said capacity.

52. A torque multiplying transmission apparatus embodying a driving member; a driven member; a rotary fluid pump comprising complemental elements; and one of said elements being actuated by said driving member and provided with a plurality of recesses receiving fluid in operation of the apparatus, another of said elements being operatively connected for actuation by said driven member and comprising members fitting into and expelling fluid from said recesses in operation of the apparatus; a fluid motor comprising reciprocating means rotatable about the axis of said driven member and driving said driven member; and means for distributing the fluid between said pump and said motor.

53. The combination as set forth in claim 52 in which said means include a central valve for timing the admission of fluid to and from said pump.

54. A torque multiplying hydraulic transmission comprising driving means; driven means; a pump actuated by the relative rotation of said driving and said driven means comprising a plurality of rotatable recesses adapted to receive fluid and from which fluid is expelled in operation; a motor comprising a plurality of reciprocable members rotatable at speeds different from the speeds of rotation of said pump recesses and driving said driven means; and means for distributing fluid between said pump and said motor.

55. The combination as set forth in claim 54 in which said last mentioned means comprises a rotary valve member timing said pump and a stationary valve member timing said motor.

56. A torque multiplying transmission apparatus embodying a driving member; a driven member; a fluid pump comprising an element actuated by said driving member and a complemental element operatively connected to said driven member; one of said elements being provided with a plurality of rotatable reciprocable members coacting with the other of said elements to pump fluid in operation of the apparatus; a fluid motor comprising reciprocating members driving said driven member, said reciprocating members being rotatable as a unit at different speed than said pump elements, and fluid passages between said pump and said motor.

57. The combination as set forth in claim 56 in which said motor is of variable volumetric capacity together with means for varying said capacity.

58. A torque multiplying hydraulic transmission comprising driving means; driven means; a pump actuated by the relative rotation of said driving and said driven means comprising a plurality of rotatable reciprocable members operative to pump fluid; a motor comprising a plurality of reciprocable members rotatable at speeds different from the speeds of rotation of said reciprocating pump members and driving the driven means; and means for distributing fluid between said pump and said motor.

59. The combination as set forth in claim 58 in which said last mentioned means comprises a rotary valve member timing said pump, and a stationary valve member timing said motor.

60. In a hydraulic transmission, a driving member; a driven member; a pump actuated by said driving and driven members; a motor actuated by fluid delivered thereto by said pump and driving said driven member; stationary fluid distributing means timing admission of fluid to said motor; and fluid distributing means rotatable with said driven member timing the flow of fluid between said pump and said stationary means; said stationary means and said rotatable distributing means being mounted substantially as a unit immediately adjacent said motor.

61. The combination as set forth in claim 60 together with a rotatable clutch valve mounted for oscillation on said stationary means.

62. The combination as set forth in claim 60 together with a rotatable reversing valve mounted for oscillation in said stationary means.

63. The combination as set forth in claim 60 together with a rotatable clutch and a rotatable reversing valve supported by said stationary means.

In testimony whereof, we have hereunto set our hands.

ELWYN M. RAYBURN.
ALDEN G. RAYBURN.